United States Patent [19]

Ho et al.

[11] Patent Number: 5,026,794

[45] Date of Patent: Jun. 25, 1991

[54] ADDUCTS OF AN HYDROXY-FREE ACRYLATE RESIN AND AN EPOXY RESIN

[75] Inventors: Kam W. Ho; Patrick W. Lam, both of Sarnia, Canada

[73] Assignee: Polysar Limited, Sarnia, Canada

[21] Appl. No.: 355,472

[22] Filed: May 23, 1989

[51] Int. Cl.$^5$ ............................................. C08L 63/10
[52] U.S. Cl. .................... 525/532; 525/502; 525/529; 525/531
[58] Field of Search .................. 525/532, 529, 531

[56] References Cited

U.S. PATENT DOCUMENTS

| | | | |
|---|---|---|---|
| 4,327,013 | 4/1982 | Peters | 525/426 |
| 4,374,963 | 2/1983 | Morgan et al. | 525/531 |
| 4,503,200 | 3/1985 | Corley | 525/529 |
| 4,835,241 | 5/1989 | Waddill | 525/532 |
| 4,910,270 | 3/1990 | Maekawa et al. | 525/532 |

FOREIGN PATENT DOCUMENTS

| | | | |
|---|---|---|---|
| 55-18401 | 2/1980 | Japan | 525/529 |
| 63-170410 | 7/1988 | Japan | 525/531 |
| 640556 | 6/1980 | U.S.S.R. | 525/531 |

*Primary Examiner*—John C. Bleutge
*Assistant Examiner*—Robert E. L. Sellers, II
*Attorney, Agent, or Firm*—Stevens, Davis, Miller & Mosher

[57] ABSTRACT

This invention provides an adduct of an epoxy resin and a hydroxy free acrylate resin. The novel adduct contains vinyl unsaturation and hence may be copolymerized with an ethylenically unsaturated monomer to provide a tough thermoset resin.

6 Claims, No Drawings

ADDUCTS OF AN HYDROXY-FREE ACRYLATE RESIN AND AN EPOXY RESIN

FIELD OF THE INVENTION

This invention relates to a novel adduct of an epoxy resin and an hydroxy-free acrylate resin. The adduct is a homogeneous, essentially gel-free liquid at room temperature. Tough, thermoset compositions having low water absorption and low mold shrinkage may be prepared by co-curing the adduct with an ethylenically unsaturated monomer.

BACKGROUND OF THE INVENTION

Hydroxy-free acrylate resins are known articles of commerce. U.S. Pat. No. 4,327,013 describes the preparation of thermoset compositions using hydroxy-free acrylate resins. Such resins are typically co-polymerized with an ethylenically unsaturated monomer, especially styrene, to provide a comparatively inexpensive composition having relatively good mechanical strength properties. Hydroxy-free acrylate thermosets are further characterized by exhibiting low shrinkage upon molding and low water absorption.

Epoxy resins are similarly well known. Thermoset compositions prepared with epoxy resin normally have a higher service temperature and mechanical strength in comparison to acrylate resin thermosets, but are also generally more expensive. Furthermore, epoxy resins are prone to water absorption.

It is clear that a new material having a balance of the desirable properties exhibited by epoxy and acrylate resins would be a useful addition to the art. However, the two resins are prone to separate into two phases when attempts are made to co-cure them.

It has now been surprisingly discovered that a liquid adduct of a selected epoxy resin and a hydroxy-free acrylate resin may be prepared by reacting the epoxy and hydroxy-free acrylate in the presence of an amine or onium salt catalyst. The resulting adduct may be co-cured with a monoethylenically unsaturated monomer to provide a thermoset coating or molding composition.

SUMMARY OF THE INVENTION

The present invention provides an adduct of
 i) an epoxy resin having from 2 to 4 epoxy functional groups and a molecular weight from 300 to 600, and
 ii) an hydroxy-free acrylate resin according to the formula:

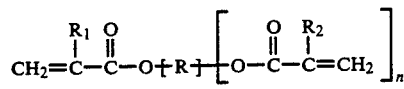

wherein R is the hydroxy-free residue of a polyhydric alcohol, $R_1$ and $R_2$ are independently hydrogen or methyl, n is from 1 to 3, and the molecular weight of said hydroxy-free acrylate resin is from 200 to 600 characterized in that said adduct is prepared by reacting said epoxy resin and said hydroxy-free acrylate resin in the presence of a catalyst selected from (a) an amine and (b) and onium salt according to the formula:

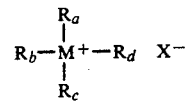

where M is selected from elemental nitrogen and elemental phosphorous, X is selected form bromine, chlorine and iodine, and $R_a$, $R_b$, $R_c$ and $R_d$ are the same or different and are selected from the group consisting of alkyl, aryl and cycloalkyl hydrocarbons having from 1 to 20 carbon atoms.

In another embodiment of the invention, there is provided a novel thermosettable composition comprising the above identified adduct and an ethylenically unsaturated monomer.

DETAILED DESCRIPTION OF THE INVENTION

The adduct of the present invention is prepared using hydroxy-free acrylate resin according to the empirical formula

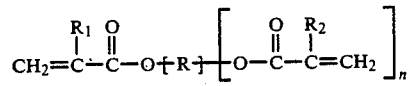

wherein R is the hydroxy-free residue of an organic polyhydric alcohol (i.e., an alcohol having at least 2 alcoholic OH groups), $R_1$ and $R_2$ may be the same or different and are selected from hydrogen or methyl and n is from 1 to 3. For ease of reference, the resin defined by the above formula will be referred to as an "hydroxy-free acrylate resin".

Hydroxy-free acrylate resin may be prepared by the conventional reaction of a polyhydric alcohol with either a carboxylic acid (such as acrylic or methacrylic acid) or with the simple ester of the carboxylic acid (such as methyl methacrylate).

The polyhydric alcohol suitable for use herein contains from 2 to 4 -OH alcoholic functional groups and is preferably an alkane polyhydric alcohol or an aromatic ring-containing polyhydric alcohol. Illustrative examples of suitable polyhydric alcohols include: diethylene glycol (also known as dihydroxy-di-ethyl ether), dipropylene glycol; 1,4 butane diol and 2,2-bis (4-hydroxyphenol) propane.

The hydroxy-free acrylate resin may also be prepared with more than one of the above-described polyhydric alcohols. Specific examples of preferred hydroxy free acrylate resin include ethoxylated bisphenol A dimethacrylte, propoxylated bisphenol A dimethacrylate, triethylene glycol dimethacrylate and diethylene glycol dimethacrylate.

An epoxy resin is also required to prepare the adduct of the present invention. The term "epoxy resin" is used herein to convey its conventional meaning (i.e., a molecule having more than one α-epoxy group: Handbook of Epoxy Resins, Lee and Neville, McGraw-Hill, 1967). Illustrative examples of suitable epoxy resins include diglycidyl/bisphenol A epoxies, such as the diglycidyl ether of bisphenol A, glycidyl ethers of novolac resins and (cyclo)aliphatic epoxies. Highly preferred epoxies have from 2 to 4 epoxy groups and a molecular weight between 350 and 500.

The adducts of the present invention are homogeneous, essentially gel free liquids at room temperature. They contain residual vinyl unsaturation which can be observed by proton nmr spectroscopy. This vinyl unsaturation allows co-curing of the present adducts with one or more ethylenically unsaturated monomers.

While not wishing to be bound by any particular theory, it is believed tht the reaction which provides the adducts of the present invention proceeds as follows:

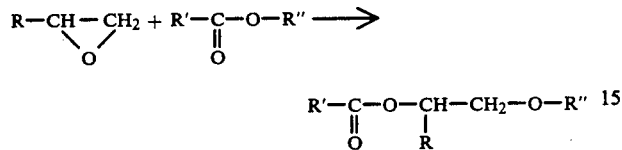

It will be noted that the above reaction does not require vinyl unsaturation, nor any hydroxyl group.

The present adducts are prepared with a selected amine or Onium salt catalyst.

Amines which can open an epoxy group are suitable for use in the present invention. The use of a tertiary amine catalyst is highly preferred in comparison to the use of a primary or secondary amine, as primary and secondary amines have a strong tendency to gel the adduct and can only be employed with great caution. Particularly preferred amines are pyridine and diazabicyclo (2.2.2) octane ("DABCO").

Suitable onium salt catalysts are defined by the formula:

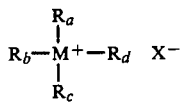

where M is selected from elemental nitrogen and elemental phosphorous, X is selected from bromine, chlorine and iodine and $R_a$, $R_b$, $R_c$ and $R_d$ are the same or different and are selected from the group of alkyl, aryl and hydrocarbons having from 1 to 20 carbon atoms.

The terms "quaternary ammonium salt" and "quaternary phosphonium salt" are commonly used to describe compounds encompassed by the above formula.

Preferred examples of the onium salt catalyst are tetrabutyl ammonium bromide ("TBAB"), tetrabutyl phosphonium bromide ("TBPB"), tetrabutyl ammonium iodide ("TBAI") and benzyl triethyl ammonium chloride ("BTEAC") of which TBAB is especially preferred.

The above amine and onium salt catalysts are capable of causing gel in a mixture of epoxy and hydroxy-free acrylate resins,if the catalyst concentration or reaction temperature is too high. This is an undesired phenomenon which can be avoided by selecting a suitably low catalyst concentration and/or reaction temperature.

It is preferred to use amine catalyst in an amount between 0.5 and 2.5 weight percent (based on the combined weight of the epoxy and hydroxy-free acrylate resin) at a temperature between 100° and 125° C. for a time between 2 and 4 hours. Onium salt catalysts are preferably used in comparatively higher concentrations (10 to 15 weight percent, based on the combined weight of the epoxy and hydroxy-free acrylate resin), at a temperature between 90 and 100° C. for reaction times of 8 to 25 hours.

The adducts of the present invention are preferably prepared using an epoxy resin/hydroxy-free acrylate resin weight ratio between 3/1 and ⅓. Highly preferred adducts are prepared using equal weights of epoxy and hydroxy-free acrylate resin.

Thermosettable compositions may be prepared by mixing a curative system with the adduct and at least one ethylenically unsaturated copolymerizable monomer which is miscible with the adduct. The term "ethylenically unsaturated monomer" refers to a monomer which contains a —CH═C< or/and a $CH_2$═C< functional group. Examples of preferred monomers include styrene and its derivatives and homologues; vinyl acetate; and "acrylate" monomers (i.e. esters of acrylic or methacrylic acid) such as methyl methacrylate and butyl acrylate.

Styrene is the most preferred ethylenically unsaturated monomer for preparing the present thermoset compositions.

The weight ratio of adduct/ethylenically unsaturated monomer in preferred thermoset compositions is from ½ to 2/1. Thermoset compositions prepared with higher levels of unsaturated monomer are prone to mold shrinkage while thermosets prepared with lower levels of unsaturated monomer tend to be glassy and brittle.

Curing of the adduct and unsaturated monomer is completed using a curative which acts on both the unsaturated monomer and the adduct. Preferred curative systems consist of a free radical curative (especially a peroxide) and an epoxy curative. Suitable free radical curatives include: t-butyl perbenzoate, t-butyl peroctoate, di-butyl peroxide and methyl ethyl ketone peroxide and are preferably utilized in an amount of between 0.5 and 3.0 weight percent. Suitable epoxy curatives include methylene dianiline, cyclohexane dicarboxylic acids or anhydrides thereof and Lewis acids which are soluble in the adduct and are preferably utilized in an amount between 2.0 and 70.0 weight percent.

The present thermoset compositions are useful as coatings and as molding compounds. Thermoset molding compounds may optionally include conventional ingredients such as reinforcing fibres (especially fibreglass or aramid fibres), fillers, pigments, low profile additives and elastomeric toughening agents.

Thermoset molding compositions prepared according to the present invention have good fracture toughness, good mechanical strength properties and exhibit low mold shrinkage and low water absorption.

Further details of the invention are illustrated by the following non-limiting examples, in which all parts and percentages are by weight unless otherwise indicated.

EXAMPLE 1

This example illustrates the preparation of an adduct of a diglycidyl/bisphenol A epoxy having an average molecular weight of 330 to 350 (sold under the tradename DER 332 by Dow Chemical) and ethoxylated bisphenol A dimethacrylate having a theoretical molecular weight of 342 (sold under the tradename SR 348 by Sartomer). The epoxy resin and hydroxy-free acrylate were used in a weight ratio of 10:13 (respectively).

The inventive adducts of experiments 1 to 4 inclusive were prepared by reacting the epoxy resin and hydroxy-free acrylate in a stirred round bottom flask at 95° C., for 24 hours, in the presence of an onium salt catalyst. The amount of catalyst used in each experiment is shown in Table 1.

The reaction flask was flushed with dry nitrogen before the reaction ingredients were added, and was heated in an oil bath. The flask was covered with a septum containing a needle hole puncture during the reaction.

The resulting adducts were homogeneous (i.e. they did not separate into distinct phases upon standing for more than 7 days at room temperature) and essentially gel free (i.e. they did not contain visible gel).

Thermoset molding compounds were prepared by mixing the adduct with styrene (1/1 weight ratio) and curing with 1,8 diamo-octane plus tertiary butyl perbenzoate (3 weight percent and 1 weight percent, respectively, based on the total weight of adduct plus styrene). The compounds were cured at 80° C. for 4 hours, then 90° C. for 16 hours and 150° C. for 2 hours in a simple mold consisting of two flat glass sheets separated by a rubber gasket.

Properties of the cured compositions of this and the following compositions were determined according to the procedures described below.

Rectangular-shaped test specimens were prepared from the molded sheets for mechanical property testing (fracture toughness and flexural strength).

The fracture toughness specimens had dimensions of 7.0 cm×0.9 cm×0.15 cm (i.e. length×width×thickness) and a single edge notch 0.3 cm deep. The flexural strength specimens had dimensions of 3.5 cm×0.9 cm×0.15 cm.

The testing was completed on a conventional materials tester sold under the tradename JJ Lloyd Tensile Tester at a crosshead speed 0.1 cm per minute.

The critical stress intensity factor ("$1c$") was determined as a measure of "fracture toughness" or alternatively stated, "impact resistance". $K_{1c}$ is calculated according to the linear elastic fracture mechanics equation:

$$K_{1c} = Si \times Y \times (a_o)^{0.5}$$

where $a_o$ is the crack length and Si is the stress at initiation of unstable crack propagation:

Si=(Maximum force to break the specimen)/(t×w) where w and t are the original width and thickness of the specimen, respectively;

Y is the geometry factor:

$$Y = 1.99 - 0.41(a_o/w) + 18.79(a_o/w)^2 - 38.48(a_o/w)^3 + 53.85(a_o/w)^4$$

Further discussion of $K_{1c}$ is given in "Compendium of Stress Intensity Factors" (Rooke, D.R. and Cartwright, D.J., Procurement Executive, Ministry of Defense, U.K.)

Flexural strength was calculated as follows: Flexural strength = [1.5×Maximum force to break specimen ×L] [W×t²] where w, t and L are the original width, thickness and span length of the specimen, respectively.

Flexural modulus was calculated as follows:

Flexural modulus = [m×L³]×[4×w×t³])

where m is the initial slope of the stress vs strain curve.

Table 1 provides a summary of the experiments of this example.

Experiments 5 and 6 are comparative. The compositions of the comparative experiments were prepared by mixing the epoxy, hydroxy-free acrylate, styrene and TBAB just before curing (i.e. the epoxy and hydroxy-free acrylate were not pre-reacted to form an adduct). The curatives and curing cycles used for the comparative experiments were the same as those used for the inventive experiments.

The fracture toughness and flexural properties of the inventive compositions are clearly superior to the corresponding properties of the comparative compositions.

Water absorption characteristics were simply measured by weighing a sample of the cured resin, immersing it in water for 7 days at room temperature and reweighing the sample. The observed weight increase was attributed to water uptake. The results were converted to weight percentages (basis measured increased in weight/original sample weight) and are reported as "water uptake" in this and the following examples (note: a "-" symbol indicates water uptake was not measured).

TABLE 1

| Experiment | TBAB Catalyst (Wt. %) | Flexural Strength (MPa) | Flexural Modulus (GPa) | $K_{1c}$ (MPa · m$^{\frac{1}{2}}$) | Remarks | Water Uptake (wt %) |
|---|---|---|---|---|---|---|
| 1 | 13.0 | 121.87 ± 4.46 | 2.94 ± 0.19 | 1.20 ± 0.11 | | 0.82 |
| 2 | 6.5 | 133.34 ± 6.59 | 3.79 ± 0.25 | 1.29 ± 0.10 | | 0.59 |
| 3 | 5.2 | 108.51 ± 20.57 | 3.03 ± 0.12 | 1.29 ± 0.10 | | — |
| 4 | 3.5 | 121.33 ± 28.89 | 3.67 ± 0.23 | 1.20 ± 0.14 | | — |
| 5* | 13.0 | 104.21 ± 22.04 | 3.08 ± 0.06 | 0.69 ± 0.12 | Phase separation upon curing | — |
| 6* | 13.0 | 105.49 ± 5.79 | 2.87 ± 0.15 | 0.67 ± 0.12 | Phase separation upon curing | — |

*comparative

EXAMPLE 2

This example illustrates the use of different types of onium salt catalysts to prepare adducts. The inventive adducts of experiments 10 to 13 inclusive were prepared by reacting 10 parts by weight of diglycidyl/bisphenol A epoxy (sold under the tradename DER 332 by Dow Chemical) with 13 parts by weight ethoxylated bisphenol A dimethacrylate (sold under the tradename SR 348 by Sartomer), in the presence of the catalysts indicated in table 2. The adducts of inventive experiments 14 to 18 inclusive were prepared using a novolac type epoxy (sold under the tradename DEN 431 by Dow Chemical), instead of the diglycidyl ether/bisphenol A epoxy used in experiments 10 to 13.

The reaction conditions for inventive experiments 10 to 16 were the same as those described in Example 1. The adducts of the inventive experiments were mixed with styrene and then cured using the same curatives and cure cycles described in Example 1.

Properties of the cured compositions are shown in Table 2.

Experiments 17 and 18 are comparative. The molded composition of experiment 17 was prepared without catalyst, while the composition of experiment 18 was prepared by mixing epoxy, hydroxy-free acrylate, styrene and catalyst just prior to curing (i.e. without first forming an adduct). 10 parts by weight of diglycidyl/-bisphenol A epoxy and 13 parts by weight of ethoxylated bisphenol A dimethacrylate were used in both of experiments 17 and 18.

butyl perbenzoate used in the experiments of example 1).

Comparative experiment 22 was completed using the type and amounts of expoxy and acrylate resin used in experiment 20, but without pre-reacting the epoxy and acrylate to form an adduct.

TABLE 3

| Experiment | Catalyst | Amount Catalyst (Wt. %)[a] | Flexural Strength (MPa) | $K_{1c}$ (MPa · m$^{\frac{1}{2}}$) | Water Uptake (wt. %) |
|---|---|---|---|---|---|
| 20 | DABCO | 1.0 | 128.41 ± 5.49 | 1.28 ± 0.12 | 0.38 |
| 21 | Pyridine | 1.7 | 123.13 ± 3.36 | 1.23 ± 0.16 | 0.52 |
| 22* | DABCO | 1.0 | 107.25 ± 4.96 | 0.73 ± 0.25 | — |

*Comparative
[a]Based on combined weight of epoxy plus hydroxy-free acrylate.

TABLE 2

| Experiment | Catalyst | Amount Catalyst (Wt. %) | Flexural Strength (MPa) | Flexural Modulus (GPa) | $K_{1c}$ (MPa · m$^{\frac{1}{2}}$) | Water Uptake (wt %) |
|---|---|---|---|---|---|---|
| 10 | Tetrabutyl ammonium bromide | 13.0 | 121.87 ± 4.46 | 2.94 ± 0.19 | 1.20 ± 0.11 | 0.82 |
| 11 | Tetrabutyl phosphonium bromide | 14.0 | 121.56 ± 6.24 | 3.20 ± 0.20 | 1.26 ± 0.12 | 0.71 |
| 12 | Benzyltriethyl ammonium chloride | 9.1 | 116.24 ± 30.40 | 3.74 ± 0.14 | 0.81 ± 0.02 | — |
| 13 | Tetrabutyl ammonium iodide | 14.5 | 144.38 ± 3.52 | 3.28 ± 0.17 | 1.27 ± 0.09 | 0.98 |
| 14 | Tetrabutyl ammonium bromide | 13.0 | 140.23 ± 5.36 | 3.36 ± 0.09 | 1.27 ± 0.04 | — |
| 15 | Tetrabutyl phosphonium bromide | 14.0 | 122.72 ± 0.74 | 3.54 ± 0.45 | 1.11 ± 0.11 | — |
| 16 | Benzyltriethyl ammonium chloride | 9.1 | 135.44 ± 14.86 | 3.66 ± 0.22 | 1.12 ± 0.13 | — |
| 17* | None | 0.0 | 143.77 ± 6.64 | 3.65 ± 0.16 | 0.65 ± 0.08 | — |
| 18* | Tetrabutyl ammonium bromide | 13.0* | 103.32 ± 31.41 | 3.24 ± 0.19 | 0.90 ± 0.05 | — |

*comparative

EXAMPLE 3

This example illustrates the use of amine catalysts to prepare adducts.

The inventive adducts of experiments 20 and 21 were prepared by reacting 10 parts by weight of diglycidyl ether/bisphenol A epoxy (sold under the tradename DER 332 by Dow Chemical) with 13 parts by weight of ethoxylated bisphenol A dimethacrylate (sold under the tradename SR 348 by Sartomer), in the presence of the amine catalysts indicated in table 3. The reaction was undertaken for 2 hours at 110° C., using the reaction equipment described in Example 1. The adducts were then mixed with an equivalent weight of styrene and the mixture was cured using the curatives and curing cycles described in example 1 (except for experiment 21, wherein 1.4 weight percent tertiary butyl perbenzoate was used in place of the 1.0 weight percent tertiary

EXAMPLE 4

This example illustrates the use of different types of epoxy resins to prepare inventive adducts.

In experiments 30 to 33 inclusive, ethoxylated bisphenol A dimethacrylate ("SR 348", sold by Sartomer) was reacted for 24 hours at 95° C. with an epoxy of the type shown in Table 4, in the presence of 13 percent TBAB (based on the combined weight of the epoxy plus hydroxy free acrylate. The weight ratio of epoxy to hydroxy-free acrylate used in each experiment is also shown in table 4. Cured compositions were prepared by mixing the resulting adducts with an equivalent weight of styrene and curing using the curatives and cure cycle described in Example 1.

Properties of the cured compositions are shown in Table 4.

TABLE 4

| Experiment | Epoxy | Epoxy/Acrylate (wt. ratio) | Flexural Strength (MPa) | Flexural Modulus (GPa) | $K_{1c}$ (MPa · m$^{\frac{1}{2}}$) | Water Uptake (wt. %) |
|---|---|---|---|---|---|---|
| 30 | bis A-1[a] | 10:13 | 121.87 ± 4.46 | 2.94 ± 0.19 | 1.20 ± 0.11 | 0.82 |
| 31 | Novo[b] | 10:13 | 140.23 ± 5.36 | 3.36 ± 0.09 | 1.27 ± 0.04 | — |
| 32 | tetra[c] | 10:21 | 142.60 ± 5.87 | 3.28 ± 0.16 | 1.14 ± 0.20 | 1.05 |
| 33 | bis A-2[d] | 10:10 | 123.69 ± | 3.22 ± | 1.05 ± | — |

TABLE 4-continued

| Experiment | Epoxy | Epoxy/Acrylate (wt. ratio) | Flexural Strength (MPa) | Flexural Modulus (GPa) | $K_{1c}$ (MPa · m$^{\frac{1}{2}}$) | Water Uptake (wt. %) |
|---|---|---|---|---|---|---|
| | | | 23.12 | 0.29 | 0.18 | |

Notes:
[a] glycidyl ether/bisphenol A epoxy (sold under the tradename DER 332 by Dow Chemical).
[b] novolac epoxy having an average molecular weight from 330 to 350, (sold under the tradename DEN 431 by Dow Chemical).
[c] a tetraepoxide having an average molecular weight from 410 to 430 (sold under the tradename MY720 by Ciba Geigy).
[d] glycidyl ether/bisphenol A epoxy (sold under the tradename EPON 828 by Shell).

EXAMPLE 5

This example illustrates the use of different hydroxy-free acrylates to prepare adducts.

In experiments 40 to 43 inclusive, a glycidyl ether/bisphenol A epoxy ("DER 332", sold by Dow Chemical) was reacted for 24 hours at 95° C. with an hydroxy-free acrylate of the type shown in Table 5, in the presence of 13 percent TBAB (based on the combined weight of the epoxy plus hydroxy-free acrylate). The weight ratio of epoxy to hydroxy-free acrylate used in each experiment is also shown in Table 5. Cured molding compositions were prepared by mixing the resulting adducts with an equivalent weight of styrene and using the curatives and curing cycle described in Example 1.

Properties of the molded compositions are shown in Table 5.

The molded composition of comparative experiment 44 was prepared by curing the same ingredients used in experiment 43, but without first pre-reacting the epoxy and hydroxy-free acrylate.

TABLE 5

| Experiment | Acrylate | Epoxy/Acrylate (wt. ratio) | Flexural Strength (MPa) | Flexural Modulus (GPa) | $K_{1c}$ (MPa · m$^{\frac{1}{2}}$) |
|---|---|---|---|---|---|
| 40 | Ethyoxylated Bisphenol A dimethacrylate[1] | 10:13 | 121.87 ± 4.46 | 2.94 ± 0.19 | 1.20 ± 0.11 |
| 41 | Ethoxylated Bisphenol A diacrylate[2] | 10:12 | 111.05 ± 4.75 | 3.22 ± 0.15 | 1.11 ± 0.15 |
| 42 | Diethylene Glycol Diacrylate[3] | 10:6.2 | 98.25 ± 8.15 | 3.01 ± 0.24 | 1.20 ± 0.12 |
| 43 | Trimethylolpropane trimethacrylate[4] | 10:6.6 | 86.36 ± 21.44 | 3.55 ± 0.20 | 0.91 ± 0.16 |
| 44* | Trimethylolpropane trimethacrylate[4] | 10:6.6 | 63.58 ± 16.57 | 3.53 ± 0.20 | 0.74 ± 0.15 |

Notes:
*Comparative
[1] Sold by Sartomer as SR348 resin.
[2] Sold by Sartomer as SR349 resin. (theoretical m.w. = 424)
[3] Sold by Sartomer as SR230 resin. (theoretical m.w. = 214)
[4] Sold by Sartomer as SR350 resin. (theoretical m.w. = 338)

EXAMPLE 6

This example illustrates the preparation of adducts at different reaction temperatures. In each experiment of this example, 10 parts by weight of a diglycidyl/bisphenol A epoxy ("DER 332", sold by Dow Chemical) was reacted with 13 parts by weight of ethoxylated bisphenol A dimethacrylate ("SR 348", sold by Sartomer Limited) for 24 hours at the temperature shown in table 6 in the presence of 13 percent TBAB. Molded compositions were prepared with the adducts of experiment 50-52 inclusive by mixing with styrene and curing as described in Example 1.

In experiment 53 (not shown in Table 6), 5 percent TBAB was employed at a temperature of 130° C. The epoxy/hydroxy free acrylate mixture was visibly gelled after 20 minutes.

TABLE 6

| Experiment | Reaction Temp. (°C.) | Flexural Strength | Flexural Modulus | $K_{1c}$ (MPa · m$^{\frac{1}{2}}$) |
|---|---|---|---|---|
| 50 | 80 | 143.40 ± 4.92 | 3.96 ± 0.58 | 1.06 ± 0.05 |
| 51 | 95 | 121.87 ± 4.46 | 2.94 ± 0.19 | 1.20 ± 0.11 |
| 52 | 110 | 140.80 ± 5.34 | 3.52 ± 0.25 | 1.16 ± 0.10 |

EXMAPLE 7

The example illustrates the use of different adduct to styrene weight ratios in the preparation of thermoset compositions according to the present invention. The use of a different ethylenically unsaturated monomer, namely para-methyl styrene and a mixture of styrene and methyl methacrylate, is also illustrated.

The adduct used in all experiments of this example was prepared by reacting 13 parts by weight of ethyoxylated bisphenol A dimethacrylate with 10 parts by weight of a diglycidyl ether/bisphenol A epoxy (DER 332, sold by Dow Chemical) in the presence of 13% TBAB for 24 hours at 95° C., as described in Example 1.

Thermoset compositions were prepared by curing the adduct with styrene (or para-methyl styrene), in the amounts shown in table 7, using the curatives and curing conditions described in example 1.

TABLE 7

| Experiment | Monomer | Adduct/Monomer (wt. ratio) | Flexural Strength (MPa) | Flexural Modulus (GPa) | $K_{1c}$ (MPa·m$^{\frac{1}{2}}$) |
|---|---|---|---|---|---|
| 70 | S | 4:1 | 104.42 ± 17.72 | 3.43 ± 0.13 | 0.83 ± 0.11 |
| 71 | S | 3:1 | 79.35 ± 19.76 | 3.27 ± 0.27 | 0.89 ± 0.09 |
| 72 | S | 2:1 | 121.87 ± 4.46 | 2.94 ± 0.19 | 1.20 ± 0.11 |
| 73 | S | 1:1 | 71.53 ± 5.17 | 2.18 ± 0.25 | 1.10 ± 0.10 |
| 74 | S | 1:2 | 132.17 ± 8.99 | 3.36 ± 0.31 | 0.89 ± 0.17 |
| 75 | PMS | 1:1 | 127.16 ± 5.72 | 3.12 ± 0.21 | 1.16 ± 0.14 |
| 76 | S/MMA | 1:1 | 104.92 ± 7.93 | 3.39 ± 0.46 | 1.15 ± 0.09 |

Notes:
S = Styrene
PMS = Para-methyl styrene
MMA = methyl methacrylate

EXAMPLE 8

In this example, 120 grams of ethoxylated bisphenol 4 dimethacrylate and 60 grams of diglycidyl ether of bisphenol A were mixed and analyzed by proton nmr spectroscopy. 8 grams of TBAB catalyst was then added to the acrylate/epoxy resins and allowed to react for 24 hours at 120° C. The resulting adduct was cooled and again analyzed by proton nmr spectroscopy. The reaction did not result in any significant change in the nmr signal attributed to the vinyl protons, indicating that the adduct contains vinyl functionality and that the reaction did not consume a significant quantity of the vinyl functional groups contained in the acrylate resin.

EXAMPLE 9

This example illustrates the use of an acrylonitrile-butadiene elastomer as an additive for molding compositions according to the present invention.

The adduct used in all of the experiments of this example was prepared by reacting 10 parts by weight of a glycidyl ether/bisphenol A epoxy (sold under the tradename EPON 828 by Shell) with 13 parts by weight of ethoxylated bisphenol A dimethacrylate (sold under the tradename SR 348 by Sartomer) for 5 hours at 120° C. in the presence of 2.5 weight percent TBAB catalyst.

The thermosettable molding compound of experiment 90 was prepared by mixing styrene and the adduct in a 1:1 weight ratio.

In experiments 91 and 92, the adduct was blended at room temperature with styrene and an acrylonitrilebutadiene rubber at a weight ratio of 45:45:10, respectively.

In experiment 93, 90 grams of the adduct was heated at 120° C. for 4 hours in the presence of 20 grams of the acrylonitrile-butadiene elastomer indicated in table 9. 90 grams of styrene was subsequently added to the adduct/elastomer to prepare a thermosettable modling composition.

The molding compositions of experiments 90 to 93 were cured using 25 weight percent cis-cyclohexane dicarboxylic acid anhydride and 1 percent t-butyl perbenzoate at 80° C. for 5 hours, followed by 16 hours at 100° C. and a final 2 hours at 150° C.

TABLE 9

| Experiment | Elastomer | Flexural Strength (MPa) | Flexural Modulus (GPa) | $K_{1c}$ (MPa·m$^{\frac{1}{2}}$) |
|---|---|---|---|---|
| 90 | — | 125.1 ± 3.9 | 2.67 ± 0.07 | 1.04 ± 0.07 |
| 91 | NBR1$^{(i)}$ | 123.4 ± 2.1 | 2.62 ± 0.04 | 1.18 ± 0.05 |
| 92 | NBR2$^{(ii)}$ | 116.2 ± 3.0 | 2.81 ± 0.03 | 1.52 ± 0.03 |
| 93 | NBR1 | 103.3 ± 1.8 | 2.29 ± 0.05 | 2.28 ± 0.04 |

Notes:
$^{(i)}$NBR1 = vinyl terminated, liquid acrylonitrile-butadiene rubber sold under the tradename HYCAR VTBNX (1300 × 23) by B. F. Goodrich
$^{(ii)}$NBR2 = carboxyl terminated, liquid acrylonitrile-butadiene rubber sold under the tradename HYCAR CTBNX (1300 × 18) by B. F. Goodrich.

What is claimed is:

1. A liquid adduct which is copolymerizable with at least one ethylenically unsaturated monomer, said adduct consisting of
   (i) an epoxy resin having from 2 to 4 epoxy functional groups, and
   (ii) a hydroxy-free acrylate resin according to the formula

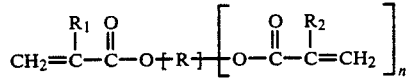

wherein R is the hydroxy-free residue of a polyhydric alcohol, $R_1$ and $R_2$ are independently hydrogen or methyl, and n is from 1 to 3, characterized in that said adduct is prepared by reacting said epoxy resin and said hydroxy-free acrylate resin in the presence of a catalyst selected from (a) an tertiery amine and (b ) an onium salt according to the formula:

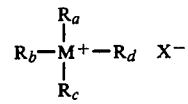

where M is selected from elemental nitrogen and elemental phosphorous, X is selected from bromine, chlorine and iodine, and $R_a$, $R_b$, $R_c$ and $R_d$ are the same or different and are selected from the group consisting of alkyl, aryl and cycloalkyl hydrocarbons having from 1 to 20 carbon atoms.

2. The adduct of claim 1 wherein said hydroxy-free acrylate resin is ethoxylated bisphenol A dimethacrylate.

3. The adduct of claim 1 wherein said epoxy resin is the diglycidyl ether of bisphenol A.

4. The adduct of claim 2 wherein said epoxy resin is the diglycidyl ether of bisphenol A.

5. The adduct of claim 1 wherein said catalyst is diazabicyclo (2.2.2) octane.

6. The adduct of claim 1 wherein the weight ratio of said epoxy resin to said acrylate resin is from 1:3 to 3:1.

* * * * *